(12) United States Patent  
Sundarababu (10) Patent No.: US 11,824,720 B2  
(45) Date of Patent: *Nov. 21, 2023

(54) AUTOMATIC CONFIGURING OF VIRTUAL NETWORKING BASED ON INFORMATION FROM A SWITCH

(71) Applicant: VMware, Inc., Palo Alto, CA (US)

(72) Inventor: Premnath Sundarababu, Chennai (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,682

(22) Filed: Mar. 8, 2022

(65) Prior Publication Data

US 2022/0200862 A1    Jun. 23, 2022

Related U.S. Application Data

(63) Continuation of application No. 16/789,446, filed on Feb. 13, 2020, now Pat. No. 11,303,522.

(30) Foreign Application Priority Data

Nov. 12, 2019  (IN) .............................. 201941045919

(51) Int. Cl.
```
H04L 41/08      (2022.01)
H04L 41/0806    (2022.01)
H04L 69/324     (2022.01)
G06F 9/455      (2018.01)
H04L 12/46      (2006.01)
```

(52) U.S. Cl.
CPC ...... *H04L 41/0876* (2013.01); *G06F 9/45558* (2013.01); *H04L 12/4641* (2013.01); *H04L 41/0806* (2013.01); *H04L 69/324* (2013.01); *G06F 2009/45562* (2013.01)

(58) Field of Classification Search
CPC ............. H04L 41/0876; H04L 12/4641; H04L 41/0806; H04L 69/324; G06F 9/45558; G06F 2009/45562
See application file for complete search history.

(56) References Cited

U.S. PATENT DOCUMENTS

| 8,990,824 B2 | 3/2015 | Nilakantan |
| 2015/0154039 A1* | 6/2015 | Zada ................... G06F 11/3664 718/1 |

(Continued)

*Primary Examiner* — Duc C Ho  
(74) *Attorney, Agent, or Firm* — Clayton, McKay & Bailey, PC (57) ABSTRACT

Examples described herein include systems and methods for automatically configuring a VM on a server using information from a switch located remotely from the server. The switch can provide the configuration information in a Link Layer Discovery Protocol ("LLDP") type-length-value ("TLV") data structure. The configuration information can include various information related to configuring a VM, such as a VM identifier, an indication of a physical port of the server, a VM interface that corresponds to the identified physical port, and a virtual local area network ("VLAN") identifier indicating that a particular VLAN corresponds to the VM, VM interface, or the physical port. The hypervisor can use this configuration information to automatically configure a newly instantiated VM, or reconfigure a VM for a new task, without manual user input.

20 Claims, 4 Drawing Sheets

(56) References Cited

U.S. PATENT DOCUMENTS

| | | |
|---|---|---|
| 2019/0068724 A1* | 2/2019 | Tsirkin ................ H04L 61/5076 |
| 2020/0186427 A1 | 6/2020 | Chunduru Venkata |
| 2020/0296005 A1 | 9/2020 | Nikain |

* cited by examiner

AUTOMATIC CONFIGURING OF VIRTUAL NETWORKING BASED ON INFORMATION FROM A SWITCH

RELATED APPLICATIONS

This application claims priority as a continuation of U.S. Pat. No. 11,303,522, titled "AUTOMATIC CONFIGURING OF VIRTUAL NETWORKING BASED ON INFORMATION FROM A SWITCH," filed Feb. 13, 2020, which claims priority under 35 U.S.C. 119(a)-(d) to Foreign Application Serial No. 201941045919 filed in India entitled "AUTOMATIC CONFIGURING OF VIRTUAL NETWORKING BASED ON INFORMATION FROM A SWITCH" on Nov. 12, 2019, by VMWARE, Inc., both of which are incorporated in their entireties by reference for all purposes.

BACKGROUND

Service providers, such as telecommunication companies, increasingly utilize virtual network functions ("VNFs") to perform operations previously handled by physical hardware appliances. Rather than maintaining the various computing devices and software necessary to run these VNFs, service providers can run their VNFs on a remote software infrastructure. This infrastructure, referred to in some instances as universal customer premises equipment ("uCPE"), can be maintained separately by a third party. It can also provide service to multiple service providers while maintaining the data from each service provider in a separate and secure manner.

Utilizing a uCPE can require a fair amount of technical knowledge regarding the physical and virtual networking attributes of the uCPE. For example, a network administrator at a service provider may want to instantiate a new virtual machine ("VM") at the uCPE. In order to do so, the network administrator would need an understanding of how to configure the uCPE's physical and virtual interfaces. For example, the network administrator would need to understand the physical-to-virtual port mapping of the uCPE as well as the command structure for providing configuration commands to the uCPE.

Even with the requisite understanding, setting up multiple VMs can be time consuming and inefficient. A network administrator would typically need to provide the same types of configuration commands each time a new VM is instantiated, slowing down the process of configuring the network.

Some service providers utilize network orchestration software packages for configuring VMs on a uCPE. These orchestration packages bring along their own downsides, such as imposing a steep learning curve and a substantial amount of time for deployment. While these full-fledged solutions may be suitable for some large-scale computing environments, they can be impractical and out of reach for smaller deployments.

As a result, a need exists for systems and methods that allow a network administrator to provide simplified configuration instructions to a uCPE, where the uCPE can automatically apply the configurations as soon as a new VM comes online. A need further exists for providing these systems and methods in a simple, scalable way that does not require full-fledged network orchestration software.

SUMMARY

Examples described herein include systems and methods for automatically configuring a VM on a server using information from a switch. In some examples, the server can be considered a uCPE or part of a uCPE. For example, the server can be one of several servers making up a cloud computing infrastructure. The server can include a hypervisor that manages multiple VMs executing on the server. The server can also include various physical ports that can be used for sending and receiving networking information and data.

In one example method, the hypervisor executing on the server receives configuration information from a switch (also referred to herein as a router) that is separate from and connected to the server. The switch can be a physical or virtualized networking appliance, for example, that is located remotely from the server and routes data to and from the server. The switch can provide the configuration information in a Link Layer Discovery Protocol ("LLDP") type-length-value ("TLV") data structure. In some examples, the switch receives the configuration information in an LLDP TLV structure from another device, then passes it on to the hypervisor.

The configuration information can be established by an administrator, such as by entering configuration parameters into a console or portal. The configuration information can include various information related to configuring a VM. For example, the configuration information can include a VM identifier, such as a name or number, that can correspond to a VM, including a VM that has not yet been created or configured. The configuration information can also include an indication of a physical port associated with the server. It can further include a VM interface that corresponds to the identified physical port. In some examples, the configuration information also includes a virtual local area network ("VLAN") identifier indicating that a particular VLAN corresponds to the physical port, VM interface, or both.

The example method can further include the hypervisor determining to instantiate a first VM. This determination can be performed based on an instruction received at the hypervisor, for example. In another example, the hypervisor can instantiate a new VM based on a detected issue with another VM, increased workloads on existing VMs, or for any other reason. In some examples, the hypervisor can instantiate the first VM such that it is associated with the VM identifier received as part of the configuration information previously.

In an additional example, the uCPE can receive an instruction to commit the first VM to a new task based on new configuration information. The new configuration information can be received from the switch in the same LLDP TLV format as the previous configuration information. The new configuration information can include, for example, the VM identifier of the VM, the VM interface of the VM, and an indication of a different physical port to be associated with that VM interface. In some examples, the VM identifier and the VM interface provided in the new configuration information is the same as those provided in the previous configuration information, although either or both could differ from the previous versions. When new configuration information is provided, the hypervisor can access the old configuration and modify it to match the new configuration information as needed.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for automatically configuring a VM on a server using information from a switch located remotely from the server. The switch can provide the configuration information in an LLDP TLV data structure. The configuration information can include various information related to configuring a VM, such as a VM identifier, an indication of a physical port of the server, a VM interface that corresponds to the identified physical port, and a VLAN identifier indicating that a particular VLAN corresponds to the VM, VM interface, or the physical port. The hypervisor can use this configuration information to automatically configure a newly instantiated VM, or reconfigure a VM for a new task, without manual user input.

Figure 1:
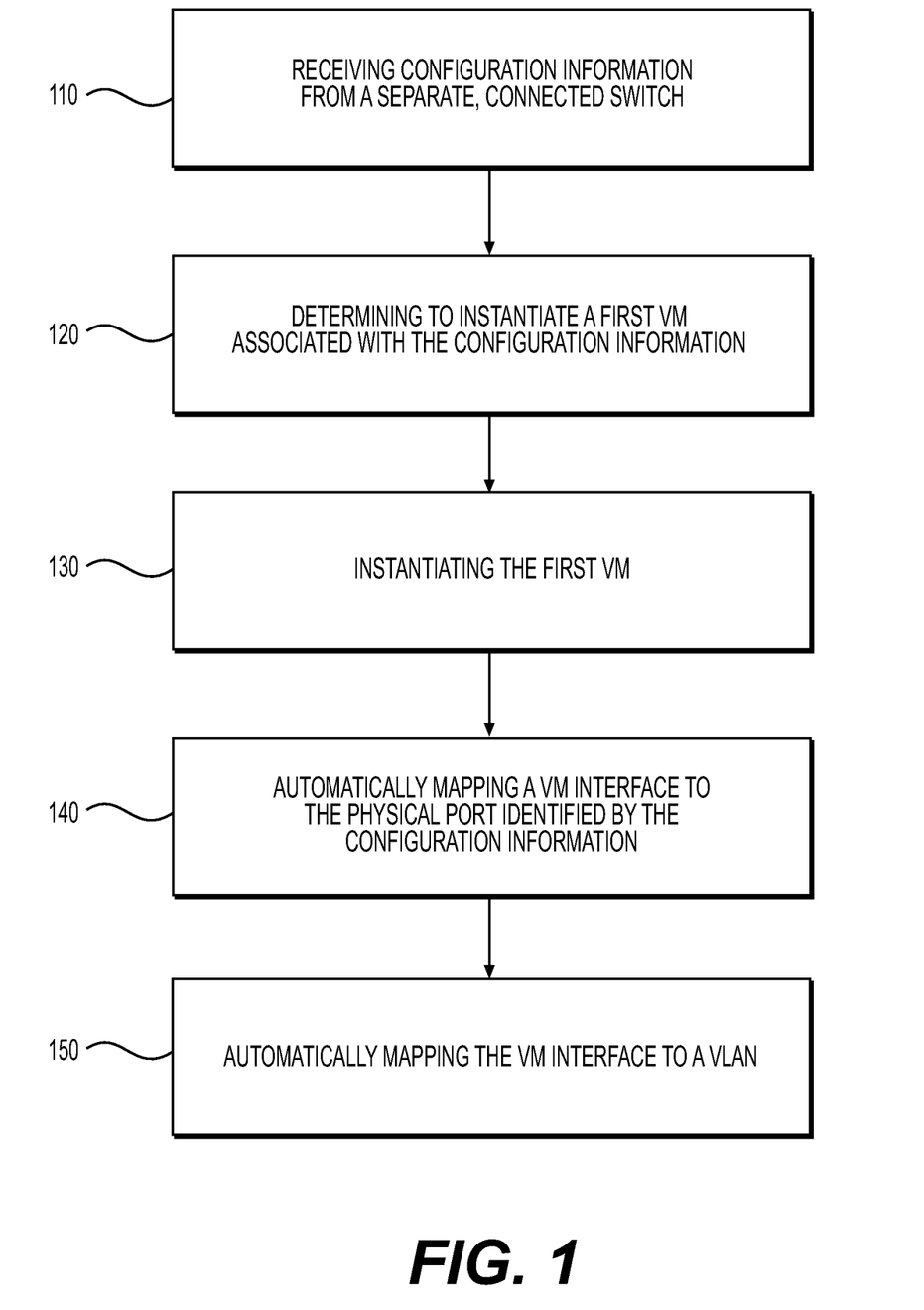
FIG. 1 is a flowchart of an example method for automatically configuring a VM on a server.

FIG. 1 provides a flowchart of an example method for automatically configuring a VM based on information from a switch. Stage 110 can include receiving configuration information at a uCPE. The uCPE can be a cloud-computing infrastructure, such as one or more computers and servers, along with associated software running on those devices. The uCPE can include various virtualized components, such as VMs, VNFs, virtual switch(es), hypervisor(s), and control planes. These are discussed in more detail with respect to FIGS. 2-4.

The uCPE can service multiple customers, also referred to as tenants. In some examples, each tenant is a separate organization that requires strict data separation from other tenants. The uCPE can provide that functionality, keeping each tenant's data in separate databases and on separate virtualized components without allowing cross-contamination of the data between tenants.

While the uCPE can include a variety of different computing devices, it is referred to herein as a "server" for convenience. The disclosures relating to the "server" can be applied, without limitation, to a single, stand-alone server, a single server within a uCPE, or to a network of connected servers in a uCPE.

The configuration information received at stage 110 can be sent to the server from a switch that is separate from the server and communicatively coupled to it. In some examples, the switch is a physical networking appliance that can send data to the server or receive data from the server and route it accordingly. For example, the switch can be a component located remotely from a uCPE but which provides a data connection to the uCPE. In another example, the switch is a component of the uCPE, routing data among different devices within the uCPE.

The switch can communicate using standard networking protocols, such as LLDP. The protocol can be used to transmit configuration information to the uCPE, such as to a server within the uCPE. The particular format and content of the transmission from the switch is discussed in more detail with respect to FIGS. 2 and 3. The transmission can be facilitated based on input from an administrator, which is also discussed in more detail with respect to those later figures.

The configuration information can include various parameters that can be used to configure a VM. For example, the configuration information can include a VM identifier, such as a name, number, or an alpha-numeric combination. The VM identifier can identify a VM, including a VM that has not yet been created or configured. The configuration information can also include an indication of a physical port associated with the server. The indication of a physical port can identify the particular port through which the VM transmits and receives information from other components within the uCPE, for example. The configuration information can further include an indication of a VM interface that is intended to correspond to the identified physical port. The indication of the VM interface can identify a particular interface of a VM that interfaces with—or is intended to interface with—the identified physical port. In some examples, the configuration information also includes a VLAN identifier corresponding to a VLAN indicating that a particular VLAN corresponds to the VM. For example, the VLAN identifier can be a VLAN tag to be applied to data coming from the VM.

Stage 120 can include determining to instantiate a first VM associated with the configuration information. In some examples, this determination is performed based on receiving an instruction to instantiate the VM. An instruction can be sent to the server, such as to a hypervisor executing on the server, requesting instantiation of the VM. The instruction can provide a VM identifier to be applied to the VM after instantiation, in one example. In some examples, the determination at stage 120 can be performed based on the hypervisor determining that the VM instantiation is necessary to accomplish a task or goal, such as balancing loads between multiple VMs or servers.

In situations where the VM is automatically instantiated by the hypervisor, the hypervisor can assign a VM identifier based on naming rules. For example, when instantiating a new VM to balance an overloaded VM, the VM identifier for the new VM can be the same as the overloaded VM with an incremental increase in number (e.g., if the overloaded VM is VM3849, the new VM can be assigned a VM identifier of VM3850).

The instantiated first VM can be associated with the configuration information based on the VM identifier of the first VM matching the VM identifier in the configuration information. Using the previous example, the configuration information can include a VM identifier of "VM3850," such that when a VM with that identifier comes online, the VM is automatically associated with the matching configuration information. An administrator can thereby anticipate future instantiations, such as by providing configuration information for VM3851, VM3852, and so on, for as many different VMs as desired. In some examples, the VM identifier in the configuration information can include wildcard characters that can correspond to any alphanumeric character. For example, a VM identifier of VM385# can correspond to VM3850 through VM3859, in an example. The administrator can leverage a known naming convention to anticipate future instantiations in this manner.

Stage 130 can include instantiating the first VM by the hypervisor executing on the server. This stage can include assigning a VM identifier, either automatically or based on an instruction, as explained previously.

Stage 140 can include automatically mapping a VM interface to the physical port identified by the configuration information. For example, the hypervisor can access the stored configuration information and retrieve identifications of the VM interface and physical port to which the VM interface should be assigned. The hypervisor can then implement that mapping, such as by configuring the mapping through the control plane of the uCPE. The control plane can be a software platform that stores such mappings and causes the mappings to be established and maintained in the prescribed manner.

In some examples, stage 140 is performed automatically, without input from the user. For example, the hypervisor can automatically check a database of saved configuration information to determine whether any configuration information exists for the VM identifier of a new VM. If such configuration information exists, the hypervisor can automatically implement the additional configuration settings within the configuration information without requiring a command or further input from the user.

Stage 150 can include automatically mapping the VM interface to a VLAN. For example, the hypervisor can access the stored configuration information and retrieve a VLAN identifier and a VM interface identifier. The hypervisor can then implement a mapping between the two, such as by configuring the mapping through the control plane of the uCPE. The mapping can specify a VLAN tag to be applied to all outgoing data from the VM interface. In this manner, the physical port can handle traffic from different VLANs simultaneously, without cross-contamination of data.

Figure 2:
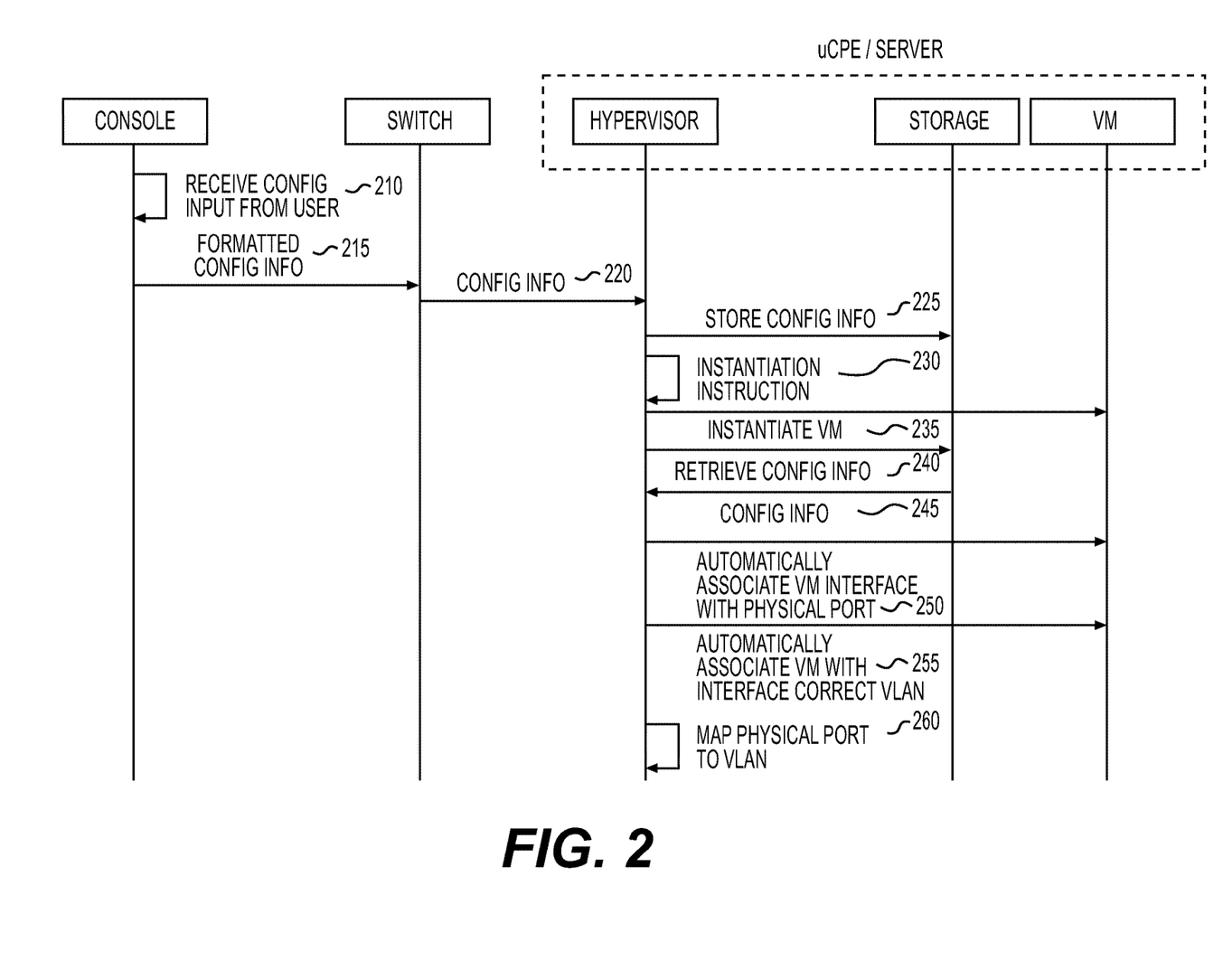
FIG. 2 is a sequence diagram of an example method for automatically configuring a VM on a server.

FIG. 2 provides a sequence diagram of an example method for automatically configuring a VM at a uCPE. At stage 210, an administrator console can receive configuration information from a user, such as an administrator. The administrator console can be a user interface that provides a user with a mechanism for providing information to a uCPE but need not be full-fledged network orchestration software. For example, the administrator console can be an interface provided within a browser application on a computing device. The administrator can navigate to a web location associated with the interface and provide configuration information through the browser. In another example, the user interface is provided through an application on a user device having a processor and a display, such as a phone, tablet, or computer. The application can be a web-based application that provides access to a web location, in one example. In another example, the application provides input directly to the relevant network devices or uCPE, as needed. Although not shown, in some examples a separate console can be provided for configuring the switch.

The user interface can include a variety of fields that an administrator can fill. For example, the interface can include separate fields for each type of configuration information, such as a VM identifier, VM interface, physical port, and VLAN identifier. In some examples, the administrator can set rules through the user interface, such as a naming rule for new VMs described with respect to FIG. 1. Some of the configuration information can be saved through the administrator console such that it does not need to be provided each time. For example, if a tenant's data is intended to be contained to a single VLAN, the administrator can enter a VLAN identifier one time and select an option to automatically apply that VLAN identifier to all subsequent VMs instantiated on behalf of that tenant.

Regardless of the form of the administrator console, it can receive the configuration input from an administrator and, as part of stage 215, format it for sending to the switch. In some examples, the formatting can utilize current LLDP TLV formatting. In those examples, a combination of a PORT-DESCRIPTION TLV and a PORT VLAN ID TLV can be utilized. The PORT-DESCRIPTION TLV can use a format such as "<phy_port>_<vm_name>_<vm_interface>," where "phy_port" corresponds to a physical port of the server or hypervisor, "vm_name" corresponds to a VM identifier, and "vm_interface" corresponds to a VM interface.

Similarly, the PORT VLAN ID TLV can use a format such as "<vm_interface>_<vlan_id>," where "vm_interface" corresponds to a VM interface and "vlan_id" corresponds to a VLAN network to which that VM interface belongs. In some examples, the PORT VLAN ID TLV can include multiple VLAN identifiers to which the VM interface can belong. Additionally, in some examples, the PORT VLAN ID TLV can indicate a VLAN to be associated with the physical port of the server that receives the TLV.

In yet other examples, stage 215 can include formatting the configuration information using a custom LLDP TLV format that incorporates all of the configuration information into a single TLV. For example, a custom protocol can be used according to a vendor-specific standard for uCPEs. The LLDP TLV can therefore take any form, provided it complies with the LLDP communication protocol, allowing it to be handled by the switch in later stages of the method. Stage 215 can also include sending the formatted configuration information to the switch at stage 215.

The switch can receive the LLDP TLV information (also referred to throughout as configuration information) and forward that information to the uCPE or server at stage 220. In one example, the switch provides the configuration information directly to a hypervisor executing on a server in the uCPE. In another example, the switch provides the configuration information to a control plane of the uCPE, which in turn provides it to the hypervisor as part of stage 220.

At stage 225, the hypervisor can store the configuration information at a persistent storage location within the server or uCPE. In some examples, the persistent storage location can be provided in a distributed manner across multiple physical storage devices, remaining accessible to the hypervisor as needed. In other examples, the storage location is memory within the server on which the hypervisor is executing.

At stage 230, the hypervisor can receive an instantiation instruction that instructs the hypervisor to create a new VM. In some examples, the instruction comes from outside the hypervisor. For example, the administrator can request the instantiation of a new VM through the console. In another example, stage 230 is determined by the hypervisor itself. For example, the hypervisor can determine that an existing VM is overloaded, and in response determine to instantiate a new VM for load balancing purposes. In another example, an automated orchestration process can request a new VM. As a result, stage 230 can include any determination by the hypervisor to instantiate a new VM.

The hypervisor can instantiate the VM at stage 235. In one example, the VM is instantiated as a result of the instruction or determination made at stage 230. The hypervisor can assign resources to the VM, such as compute, memory, and storage resources. The hypervisor can also assign a name or VM identifier to the new VM. As described previously, the hypervisor can assign the name or VM identifier according to naming rules. The administrator can provide those naming rules, in one example. The naming rules can dictate an order for naming new VMs, such as by incrementing a number within the name by one for each new VM. In another example, the naming rules can relate to a purpose or role of the VM. For instance, if a VM is being instantiated for temporary load balancing purposes, the naming convention can dictate a name such as "Temp" with a number incremented from a previous VM having a similar name. The naming convention can be useful to the administrator by allowing him or her to provide configuration information for a VM that does not yet exist. In some examples, the administrator can provide default configuration information for VMs that are not otherwise corresponding to a preidentified name.

In some examples, the instantiation of a VM can occur minutes, hours, or days after receiving the configuration information at stage 220. Upon instantiation, therefore, the hypervisor can retrieve the stored configuration information from the storage location at stages 240 and 245. In some examples, the configuration information is retrieved before instantiation. Regardless of when the configuration information is retrieved, the hypervisor can use the configuration information to configure various aspects of the VM.

For example, at stage 250, the hypervisor can automatically associate a VM interface of the VM with a physical port of the server. The VM interface can be identified by an LLDP TLV that makes up at least a portion of the configuration information. The LLDP TLV can be, for example, a PORT-DESCRIPTION TLV that includes a <phy_port> entry describing a physical port of the server. It can also include a <vm_interface> entry describing a VM interface of a VM corresponding to <vm_name>. Assuming the VM matches the <vm_name>, then the hypervisor can associate the physical port described by <phy_port> with the VM interface described by <vm_interface>. This association, or mapping, can be provided to the control plane of the uCPE and saved in an appropriate storage location. In some examples, the uCPE can perform additional mappings necessary to implement the association. For example, one or more internal ports existing between the VM interface and physical port can be mapped in a similar manner by the uCPE. In this manner, the administrator can accomplish a mapping without full knowledge of the physical and virtual infrastructure of the uCPE.

The hypervisor can perform a different but similar association at stage 255. For example, the hypervisor can automatically associate the same VM interface with a VLAN available at the server. The VLAN can be identified in the configuration information by a PORT VLAN ID TLV. The TLV can include, for example, an indication of a <vm_interface> and a <vlan_id>. The hypervisor can identify an available VLAN that matches the <vlan_id> and associate it with the identified VM interface. In some examples, this VM interface is the same as the one mapped at stage 250. The VLAN ID TLV may additionally include a field for <vm_name> to ensure that it is applied to the correct VM.

At stage 260, the hypervisor can automatically associate a physical port of the server with the VLAN identified in the configuration information. In some examples, the hypervisor retrieves the physical port identification from the PORT-DESCRIPTION TLV and matches it with the VLAN identification in the PORT VLAN ID TLV. In another example, the hypervisor associates the identified VLAN with the physical port of the server at which the PORT VLAN ID TLV was received. In some examples, either method would result in an identification of the same physical port, although this is not necessarily the case. Further, in some examples, a physical port can have multiple VLANs assigned to it. In this manner, the physical port can pass information from various tenants without risking data loss or cross contamination because the VLAN tags.

These mappings can be performed automatically, without manual input from the user or knowledge of the uCPE infrastructure. As mentioned earlier, such mappings can require mappings of intermediate ports of which an administrator might not be aware. However, the hypervisor and uCPE control plane can carry out these intermediate steps based on the configuration information without requiring further intervention.

Figure 3:
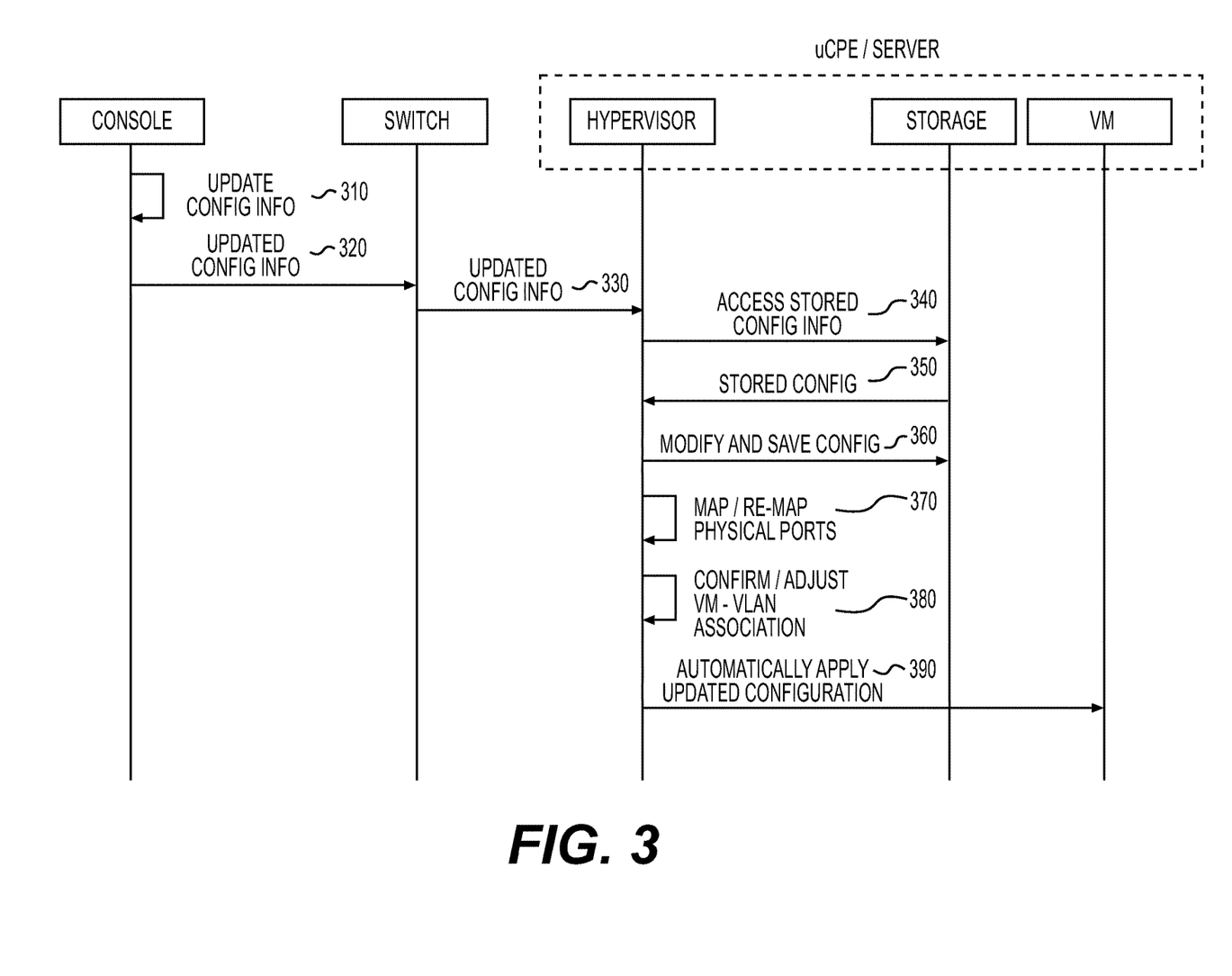
FIG. 3 is a sequence diagram of an example method for automatically committing a configured VM to a new task.

While FIG. 2 relates to the instantiation of a new VM, FIG. 3 relates to reconfiguring an existing VM to perform a different task. At stage 310, an administrator can provide updated configuration information at the console. As explained previously, the administrator console can be a user interface that provides a user with a mechanism for providing information to a uCPE but need not be full-fledged network orchestration software. The user interface can include a variety of fields that an administrator can fill or change from the previous version. For example, the administrator can select a different physical port to be associated with a particular VM or VM interface. These selections can be made in a similar manner as described with FIG. 2 and then saved through the console.

At stage 320, the console can format the received information in a format that can be handled by the switch, such as a LLDP TLV data format. In some examples, the same LLDPs described previously can be provided at this stage and then passed through to the hypervisor at stage 330. In some examples, a global command line interface can be used to provide a global command to the hypervisor. This interface can format the configuration update data in an LLDP format that includes <port>, <vm>, and <cr>, corresponding to a new physical port in the server, a VM executing on the server, and a call reference, respectively. This information can be provided to the hypervisor at stage 330.

At stage 340, the hypervisor can access stored configuration information for the VM implicated by the updated configuration information. In some examples, the call reference is used to identify records that need to be updated. The hypervisor can receive the stored configuration information at stage 350, then modify the configuration information and save the modified configuration at stage 360.

At stage 370, the hypervisor can map, or re-map, one or more physical ports of the server to a VM interface of a VM. For example, the hypervisor can assign a new physical port to a VM interface that was previously associated with a different physical port. In another example, the hypervisor can assign the new physical port as an additional port rather than a replacement. The hypervisor can determine the new mappings based on the information contained within the LLDP TLV data received at stage 330. As explained with respect to FIG. 2, the LLDP communications can include, for example, a PORT-DESCRIPTION TLV that contains entries corresponding to <phy_port>, <vm_interface>, and <vm_name>.

As part of stage 370, the hypervisor can establish a new association between a physical port of the server and a VLAN. In one example, the hypervisor associates a new VLAN with the physical port, indicating that the physical port is now authorized to transmit information tagged with a VLAN tag corresponding to the new VLAN. In another example, the hypervisor associates a new VLAN with the physical port but also disassociates the previous VLAN from that physical port. In yet another example, the hypervisor associates a previously unassociated physical port with a VLAN. Although this stage is shown as being performed by the hypervisor, it can alternatively or additionally be performed by the control plane of the uCPE that sits above the hypervisor, hierarchically.

At stage 380, the hypervisor can reconfigure an association between a VM interface and a VLAN. In one example, the updated configuration information identifies a new VLAN to be associated with a VM interface previously associated with a different VLAN. The new VLAN can be identified by a PORT VLAN ID TLV send as part of the updated configuration information at stage 330. In another example, the updated configuration information identifies a new VM interface not previously associated with a VLAN. In that case, stage 380 can include associating the new VM interface with that VLAN according to the relevant LLDP TLV.

At stage 390, the hypervisor can automatically apply the updated mappings at the VM. This stage can include, for example, sending an instruction to the VM to utilize a different VM interface or VLAN. In some examples, these instructions can be sent as part of stages 370 and 380. However, in this example a separate stage 390 is shown to illustrate an embodiment where the hypervisor provides an instruction to the VM to implement one or more updated mappings.

Figure 4:
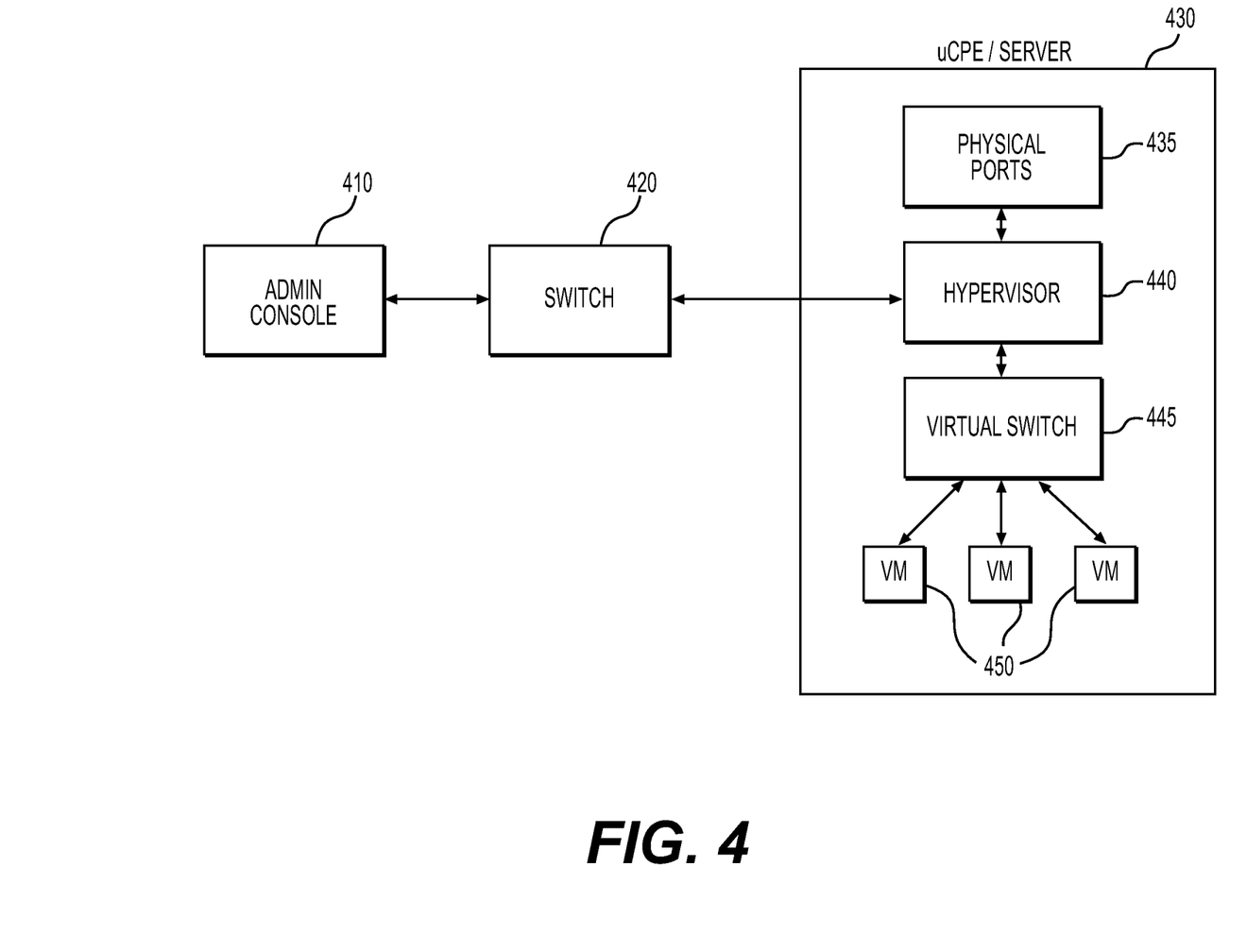
FIG. 4 is an illustration of an example system for performing methods described herein.

FIG. 4 provides an illustration of an example system for performing the various methods described herein. The system can include an administrator console 410, a switch 420, and a uCPE/server 430. The administrator console 410 can be used to receive configuration inputs from a user such as an administrator. For example, the administrator console 410 can be an interface provided within a browser application on a computing device. The administrator can navigate to a web location associated with the interface and provide configuration information through the browser. In another example, the user interface is provided through an application on a user device having a processor and a display, such as a phone, tablet, or computer. The application can be a web-based application that provides access to a web location, in one example. In another example, the application provides input directly to the relevant network devices or uCPE, as needed.

The user interface of the administrator console 410 can include a variety of fields that an administrator can fill. For example, the interface can include separate fields for each type of configuration information, such as a VM identifier, VM interface, physical port, and VLAN identifier. In some examples, the administrator can set rules through the user interface, such as a naming rule for new VMs described previously. Some of the configuration information can be saved through the administrator console 410 such that it does not need to be provided each time. For example, if a tenant's data is intended to be contained to a single VLAN, the administrator can enter a VLAN identifier one time and select an option to automatically apply that VLAN identifier to all subsequent VMs instantiated on behalf of that tenant.

Regardless of the form of the administrator console 410, it can receive the configuration input from an administrator and format it for sending to the switch 420. In some examples, the formatting can utilize LLDP TLV formatting. In those examples, a combination of a PORT-DESCRIP-TION TLV and a PORT VLAN ID TLV can be utilized. The PORT-DESCRIPTION TLV can use a format such as "<phy_port>_<vm_name>_<vm_interface>," where "phy_port" corresponds to a physical port of the server or hypervisor, "vm_name" corresponds to a VM identifier, and "vm_interface" corresponds to a VM interface. Similarly, the PORT VLAN ID TLV can use a format such as "<vm_interface>_<vlan_id>," where "vm_interface" corresponds to a VM interface and "vlan_id" corresponds to a VLAN network to which that VM interface belongs. In some examples, the PORT VLAN ID TLV can include multiple VLAN identifiers to which the VM interface can belong. Additionally, in some examples, the PORT VLAN ID TLV can indicate a VLAN to be associated with the physical port of the server 430 that receives the TLV.

In some examples, the administrator console 410 can utilize natural language processing ("NLP") techniques to process input from an administrator and translate that input into actionable items. For example, the administrator can provide a plain-language instruction such as "Spin up a new VM called VM123 and map the ENO1 port to the first physical port of the server. And use VLAN 2." The administrator console 410 can receive this instruction and parse the language to identify relevant configuration-information components. For example, the console 410 can identify VM123 as the <vm_name>, eno1 as the <vm_interface>, eth1 (the first physical port 435 of the server 430) as <phy_port>, and VLAN 2 as the <vlan_id>. The console 410 can then format this information into one or more LLDP TLV pairings.

As discussed previously, the LLDP TLV information can be provided to a switch 420. The switch 420 can be a physical or virtual networking device or appliance that connects multiple servers or computers to one another. For example, the switch 420 can connect the server 430 to the administrator console 410, tenant devices (such as employee computers or on-premises servers), and to the internet at large. In some examples, the switch 420 can provide the LLDP configuration information to a hypervisor 440 executing at the server 430. The hypervisor 440 can be part of a software layer that manages one or more VMs 450 on the server 430. For example, the hypervisor 440 can determine whether to instantiate a new VM 450 or terminate or otherwise modify an existing VM 450. The hypervisor 440 can also assign computing resources to the VMs 450 and can balance resources among multiple VMs 450 as their workloads fluctuate.

The hypervisor 440 can communicate directly with the VMs 450 or through a virtual switch 445. The virtual switch 445 can be a software application executing on the server 430 that allows for communication to and between the various VMs 450. For example, an instruction sent from the hypervisor 440 can be routed to a VM 450 through the virtual switch 445. Similarly, a communication from one VM 450 to another VM 450 can be routed through the virtual switch 445.

The hypervisor can also manage physical ports 435 within the server 430. The physical ports 435 can be physical interfaces from which data is transmitted from and received at the server 430. For example, communications from the switch 420 can be received at a physical port 435 of the server 430. The hypervisor 440 can be aware of the physical ports 435, such that it can determine which physical port 435 receives a particular communication. In this manner, the server 430 can receive a VLAN identification, for example through a PORT VLAN ID TLV, and associate the relevant VLAN with the physical port 435 that received the TLV.

Similarly, the physical ports 435 can receive additional or alternative LLDP communications from the switch 420.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for reconfiguring a virtual machine (VM) on a server, comprising:
   receiving, at a hypervisor executing on the server, updated configuration information from a switch separate from and connected to the server, the configuration information comprising:
   an indication of a second physical port of the server;
   a VM identifier; and
   a VM interface corresponding to the second physical port;
   retrieving, by the hypervisor, stored configuration information for the VM, wherein the VM is associated with the VM identifier and the VM interface is mapped to a first physical port;
   modifying the stored configuration information using the updated configuration information; and
   automatically reconfiguring the VM such that the VM interface is mapped to the second physical port.

2. The method of claim 1, wherein the updated configuration information further comprises a virtual local area network (VLAN) identifier indicating at least one VLAN associated with the VM interface.

3. The method of claim 2, further comprising mapping the second physical port to the at least one VLAN based on the VLAN identifier being received at the second physical port.

4. The method of claim 1, wherein the updated configuration information utilizes a Link Layer Discovery Protocol (LLDP) type-length-value (TLV) data structure.

5. The method of claim 1, wherein the VM is associated with the VM identifier based on a name of the VM that is mapped to the VM identifier.

6. The method of claim 1, further comprising receiving an instruction to reconfigure the VM such that the VM interface is mapped to the first physical port rather than the second physical port.

7. The method of claim 6, further comprising modifying the stored configuration information to match the instruction to reconfigure the VM such that VM interface is mapped to the first physical port.

8. A non-transitory, computer-readable medium containing instructions that, when executed by a processor, cause the processor to perform stages for automatically configuring a virtual machine (VM) on a server, the stages comprising:
   receiving, at a hypervisor executing on the server, updated configuration information from a switch separate from and connected to the server, the configuration information comprising:
   an indication of a second physical port of the server;
   a VM identifier; and
   a VM interface corresponding to the second physical port;
   retrieving, by the hypervisor, stored configuration information for the VM, wherein the VM is associated with the VM identifier and the VM interface is mapped to a first physical port;
   modifying the stored configuration information using the updated configuration information; and
   automatically reconfiguring the VM such that the VM interface is mapped to the second physical port.

9. The non-transitory, computer-readable medium of claim 8, wherein the updated configuration information further comprises a virtual local area network (VLAN) identifier indicating at least one VLAN associated with the VM interface.

10. The non-transitory, computer-readable medium of claim 9, the stages further comprising mapping the second physical port to the at least one VLAN based on the VLAN identifier being received at the second physical port.

11. The non-transitory, computer-readable medium of claim 8, wherein the updated configuration information utilizes a Link Layer Discovery Protocol (LLDP) type-length-value (TLV) data structure.

12. The non-transitory, computer-readable medium of claim 8, wherein the VM is associated with the VM identifier based on a name of the VM that is mapped to the VM identifier.

13. The non-transitory, computer-readable medium of claim 8, the stages further comprising receiving an instruction to reconfigure the VM such that the VM interface is mapped to the first physical port rather than the second physical port.

14. The non-transitory, computer-readable medium of claim 13, the stages further comprising modifying the stored configuration information to match the instruction to reconfigure the VM such that VM interface is mapped to the first physical port.

15. A system for automatically configuring a virtual machine (VM) on a server, comprising:
   a memory storage including a non-transitory, computer-readable medium comprising instructions; and
   a computing device including a hardware-based processor that executes the instructions to carry out stages comprising:
   receiving, at a hypervisor executing on the server, updated configuration information from a switch separate from and connected to the server, the configuration information comprising:
   an indication of a second physical port of the server;
   a VM identifier; and
   a VM interface corresponding to the second physical port;
   retrieving, by the hypervisor, stored configuration information for the VM, wherein the VM is associated with the VM identifier and the VM interface is mapped to a first physical port;
   modifying the stored configuration information using the updated configuration information; and
   automatically reconfiguring the VM such that the VM interface is mapped to the second physical port.

16. The system of claim 15, wherein the updated configuration information further comprises a virtual local area network (VLAN) identifier indicating at least one VLAN associated with the VM interface.

17. The system of claim 16, the stages further comprising mapping the second physical port to the at least one VLAN based on the VLAN identifier being received at the second physical port.

18. The system of claim 15, wherein the updated configuration information utilizes a Link Layer Discovery Protocol (LLDP) type-length-value (TLV) data structure.

19. The system of claim 15, wherein the VM is associated with the VM identifier based on a name of the VM that is mapped to the VM identifier.

20. The system of claim 15, the stages further comprising receiving an instruction to reconfigure the VM such that the VM interface is mapped to the first physical port rather than the second physical port.

\* \* \* \* \*